(12) United States Patent
Brody et al.

(10) Patent No.: US 9,676,479 B2
(45) Date of Patent: Jun. 13, 2017

(54) VTOL AIRCRAFT

(71) Applicant: XTI Aircraft Company, Greenwood Village, CO (US)

(72) Inventors: David E. Brody, Greenwood Village, CO (US); Dennis D. Olcott, Castle Pines, CO (US)

(73) Assignee: XTI AIRCRAFT COMPANY, Greenwood Village, CO (US)

( * ) Notice: Subject to any disclaimer, the term of this patent is extended or adjusted under 35 U.S.C. 154(b) by 290 days.

(21) Appl. No.: 14/706,407

(22) Filed: May 7, 2015

(65) Prior Publication Data

US 2016/0214710 A1    Jul. 28, 2016

Related U.S. Application Data

(60) Provisional application No. 61/989,935, filed on May 7, 2014.

(51) Int. Cl.
| | | |
|---|---|---|
| *B64C 29/00* | (2006.01) | |
| *B64C 27/28* | (2006.01) | |
| *B64D 35/04* | (2006.01) | |
| *B64C 9/00* | (2006.01) | |
| *B64C 27/26* | (2006.01) | |

(52) U.S. Cl.
CPC .............. *B64C 27/28* (2013.01); *B64C 9/00* (2013.01); *B64C 27/26* (2013.01); *B64C 29/0025* (2013.01); *B64C 29/0033* (2013.01); *B64D 35/04* (2013.01); *B64C 2009/005* (2013.01)

(58) Field of Classification Search
CPC . B64C 27/28; B64C 29/0008; B64C 27/0016; B64C 27/0025; B64C 27/0033; B64D 35/04
See application file for complete search history.

(56) References Cited

U.S. PATENT DOCUMENTS

| | | | |
|---|---|---|---|
| 1,987,788 A | * | 1/1935 | Morton ................... B64C 39/00 244/56 |
| 2,700,425 A | | 1/1955 | Ruble |
| (Continued) | | | |

FOREIGN PATENT DOCUMENTS

WO    WO 2012-102698 A1    8/2012

OTHER PUBLICATIONS

Notification of Transmittal of The International Search Report and The Written Opinion of The International Searching Authority, or the Declaration, issued by The Korean Intellectual Property Office for PCT/US2015/029751 on Feb. 16, 2016, 16 pages.

*Primary Examiner* — Nicholas McFall

(74) *Attorney, Agent, or Firm* — Perkins Coie LLP

(57) ABSTRACT

A vertical takeoff and landing aircraft includes a pair of ducted lift/thrust fans that are rotatably movable between a first vertical lift position and a second horizontal thrust position. The lift/thrust fans are disposed within curvilinear fan recesses formed within leading edge portions of the aircraft's wings. A downwardly exhausting, ducted lift fan is disposed within the aircraft's fuselage, aft of the aircraft's pitch axis. A power plant, disposed within the fuselage, is coupled with the lift/thrust fans and the lift fan by a transmission system. The lift/thrust fans and lift fan are positioned with respect to one another to be triangulated about the aircraft's center of gravity and the aircraft's center of lift.

21 Claims, 14 Drawing Sheets

(56) References Cited

U.S. PATENT DOCUMENTS

| | | | |
|---|---|---|---|
| 204,108 A | 3/1966 | Peterson | |
| 3,335,977 A | 8/1967 | Meditz | |
| 3,499,620 A | 3/1970 | Haberkorn et al. | |
| 3,638,884 A * | 2/1972 | Timperman | B64C 29/0025 |
| | | | 244/12.3 |
| 3,652,037 A | 3/1972 | Dolby | |
| 4,022,405 A | 5/1977 | Peterson | |
| D274,511 S | 7/1984 | Clifton | |
| D274,512 S | 7/1984 | Clifton | |
| D302,676 S | 8/1989 | Clifton | |
| D311,719 S | 10/1990 | Haga | |
| 5,419,514 A | 5/1995 | Ducan | |
| 5,597,137 A | 1/1997 | Skoglun et al. | |
| 6,708,920 B2 | 3/2004 | Fukuyama | |
| D493,411 S | 7/2004 | Fong | |
| D500,008 S | 12/2004 | Bulaga | |
| 6,843,447 B2 | 1/2005 | Morgan | |
| 6,886,776 B2 | 5/2005 | Wagner et al. | |
| 6,892,980 B2 | 5/2005 | Kawai | |
| 7,267,300 B2 * | 9/2007 | Heath | B64C 15/14 |
| | | | 244/12.3 |
| 7,410,122 B2 | 8/2008 | Robbins et al. | |
| 7,857,254 B2 | 12/2010 | Parks | |
| 7,874,513 B1 | 1/2011 | Smith | |
| 8,181,903 B2 | 5/2012 | Posva | |
| D665,333 S | 8/2012 | Oliver | |
| 8,777,150 B2 | 7/2014 | Wang et al. | |
| 2004/0245374 A1 | 12/2004 | Morgan | |
| 2006/0016930 A1 | 1/2006 | Pak | |
| 2007/0018035 A1 | 1/2007 | Saiz et al. | |
| 2007/0057113 A1 | 3/2007 | Parks | |
| 2007/0246601 A1 | 10/2007 | Layton | |
| 2009/0127379 A1 | 5/2009 | Lugg | |
| 2012/0043413 A1 | 2/2012 | Smith et al. | |
| 2012/0091257 A1 * | 4/2012 | Wolff | B64C 29/0033 |
| | | | 244/12.4 |
| 2014/0151502 A1 | 6/2014 | Kosheleff et al. | |
| 2014/0339372 A1 | 11/2014 | Volvoick et al. | |
| 2015/0314865 A1 * | 11/2015 | Bermond | B64C 29/0033 |
| | | | 244/17.27 |

* cited by examiner

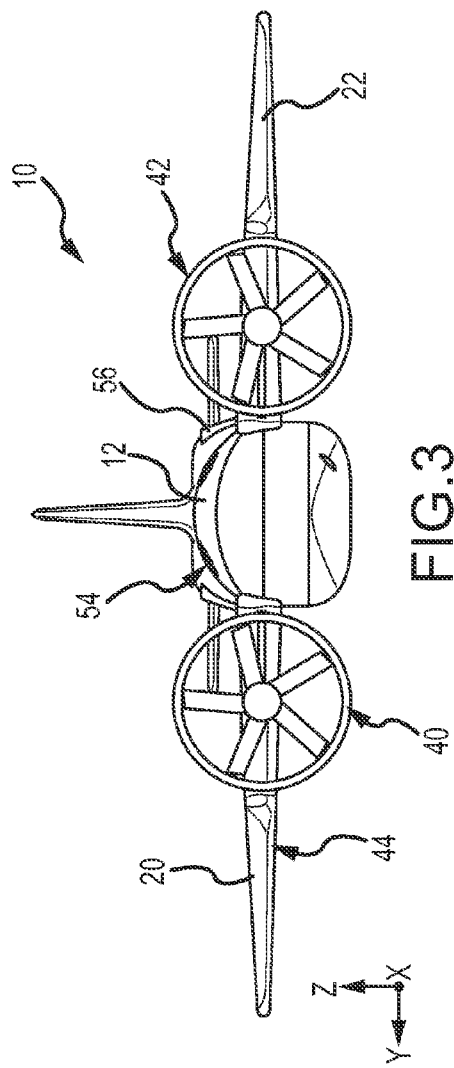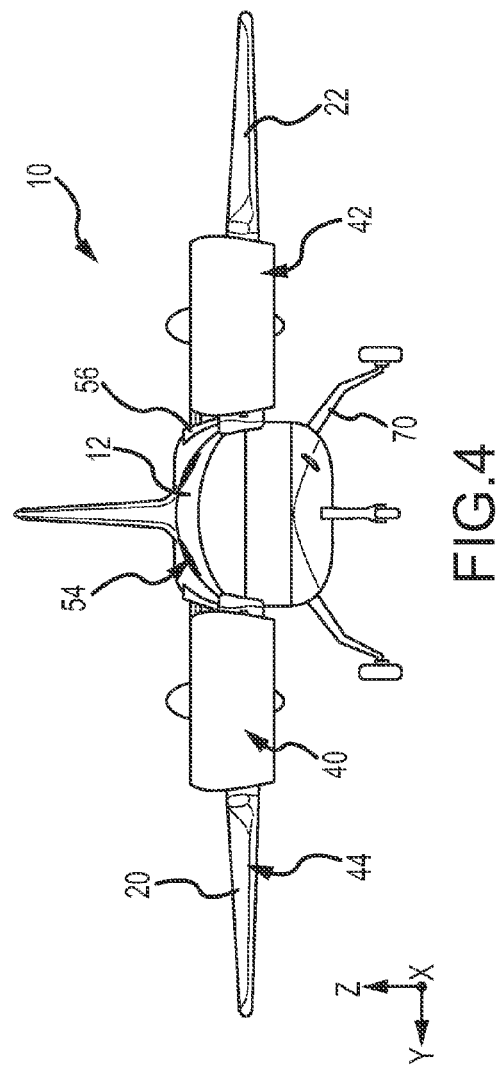

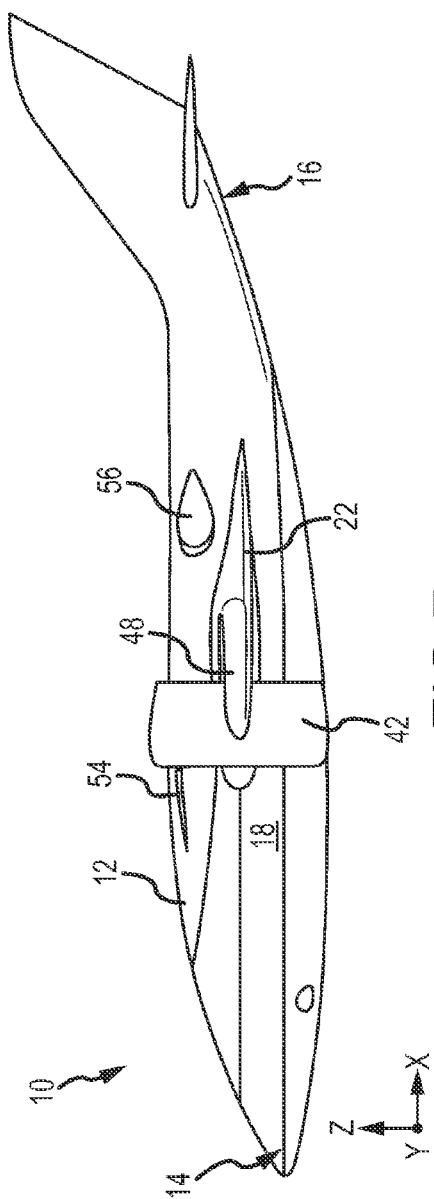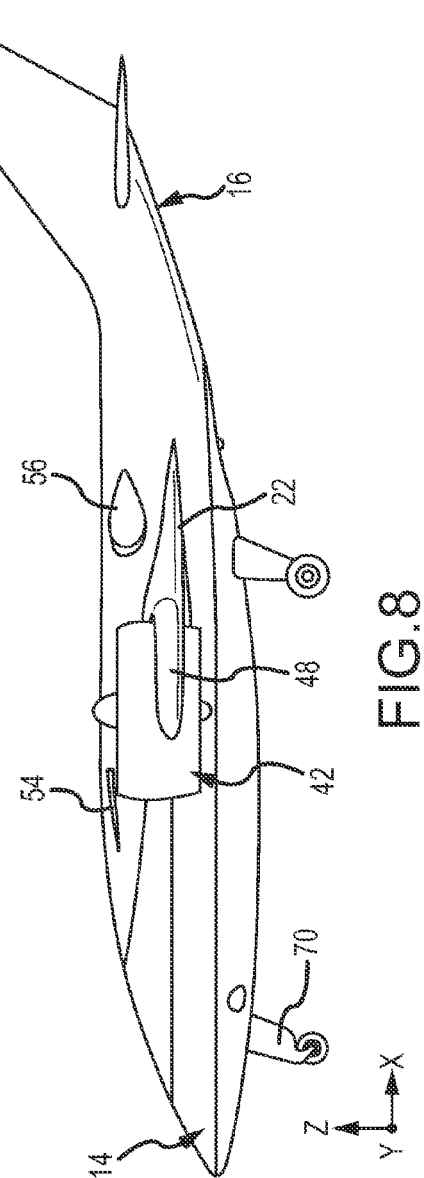

VTOL AIRCRAFT

CROSS-REFERENCE TO RELATED APPLICATION(S)

This application claims the benefit of U.S. Provisional Patent Application No. 61/989,935, filed May 7, 2014, which is incorporated herein by reference in its entirety for all purposes.

BACKGROUND

Airports are becoming increasingly necessary near urban areas to address the needs of commuters and other travel between cities. However, airports occupy a large footprint due to long runways and expansive air space needed for fixed wing aircraft to safely takeoff and land. Constructing such airports is also cost prohibitive for small and medium sized municipalities. Where large cities are better situated to afford the construction of airports, the noise, pollution and safety issues presented by urban airports is problematic. Accordingly, there is a long-felt need in the aviation industry for small, affordable, vertical takeoff and landing (VTOL) aircraft that may takeoff, land, and be stored, on relatively small parcels of commercial and residential real estate.

Historically, the aviation industry believed that helicopters would fulfill the need for small, affordable, VTOL aircraft. Unfortunately, helicopters remain a special-purpose aircraft due to their control systems, their large-diameter rotors, and their slow speed and limited range. Helicopter control systems include complex mechanisms for continuously adjusting the rotor pitch. Such control systems are expensive to construct and to maintain. Moreover, helicopters are notoriously difficult to fly, requiring specialized flight training, particularly as compared to fixed-wing aircraft. Further, the large-diameter exposed rotors present serious safety and operational challenges. Helicopters also suffer from their limited ability to fly anywhere near the speed and range of fixed-wing aircraft. Accordingly, traditional helicopter technology is ill suited to address important operational and user needs and demands.

Over the decades, there have been numerous attempts to combine the speed, range and comfort of a fixed-wing airplane with the VTOL and hover capability of a helicopter. However, except for two military aircraft, the British Harrier jet and the U.S. Air Force F-35, the tiltrotor category of aircraft is the only combined VTOL/fixed-wing aircraft which appears to be near FAA certification and commercial production. However, tiltrotors can only lift off and land vertically because the rotor blades would strike the ground in the forward flight configuration. Therefore, the gross weight of a tiltrotor aircraft is less than fixed-wing aircraft, which are capable of taking off on a runway. The large engine/rotor assemblies also diminish the aerodynamics of the wings to which they are secured. While this reduces performance, it further decreases safety where an emergent gliding landing is necessary. This is particularly problematic in tiltrotor aircraft where a gliding landing becomes necessary shortly after takeoff when the rotors are positioned vertically, and a "tilt-wing" aircraft when the rotors and wings are positioned vertically. Further, because of its size and complexity, the tiltrotor could not be the basis (from a physical or engineering standpoint) for a light, fast, compact, and affordable aircraft in the commercial market.

There is another category of VTOL aircraft designed to reach high speeds—that is, helicopters with additional components to increase speed, such as propellers, known as "compound helicopters." Sikorsky's X2 technology aircraft and AVX Aircraft Company's coaxial rotor/dual ducted fan technology are included in this category. The Sikorsky and AVX aircraft are not in commercial production, but are designed to be capable of achieving high speed with VTOL and hovering capability superior to any fixed-wing aircraft except the tilt-rotor. However, similar to the tilt-rotor, these compound helicopters have standard large helicopter blades for lift during take-off and landing, rather than smaller safer ducted fans for lift during take-off and landing. Various prototype or experimental aircraft with rotating ducted fans were flown in the mid-20th century. However, the engines and fans didn't provide sufficient lift for cargo or passengers, and those aircraft experienced significant controllability problems.

Many of these prior art VTOL aircraft designs suffer a wide array of similar disadvantages that have prevented their wide-spread acceptance as a day-to-day commuter aircraft. Another disadvantage is that many such designs require several times the horsepower to maintain the aircraft aloft, in takeoff and hover modes. Accordingly, such aircraft suffer from relatively high rates of fuel consumption, both while hovering and in forward, horizontal flight.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

Aircraft, according to the present technology, are fundamentally different from prior aircraft designs. In particular, embodiments of the present aircraft present fixed-wing, ducted fan, VTOL aircraft that use a uniquely configured set of triangulated, ducted fans. This provides aircraft that are practical, with competitive speed, range, and comfort for passengers, and a substantial payload capability.

In various embodiments, the aircraft includes a fuselage having a forward end portion, a rearward end portion, and a central portion that extends between the forward end portion and rearward end portion. The fuselage defines a central longitudinal axis of the aircraft. A pair of wings extend laterally outward from the fuselage. A downwardly exhausting, ducted lift fan is disposed within the fuselage, between a pitch axis of the aircraft and the rearward end portion of the fuselage. At least one retractable and re-closeable cover that is selectively movable between open and closed positions with respect to the ducted lift fan. A pair of ducted lift/thrust fans are coupled with the pair of wings such that the fans are positioned symmetrically with one another on opposite sides of a roll axis of the aircraft, forward of the pitch axis. The pair of ducted lift/thrust fans are selectively, rotatably movable between a first position in which they provide vertical lift and a second position in which they provide horizontal thrust.

In some embodiments, leading edge portions of each of the aircraft wings include a curvilinear fan recess. Each of the pair of ducted lift/thrust fans are rotatably disposed within a curvilinear fan recess. Accordingly, the curvilinear fan recesses are shaped to approximate a shape of a circumferential edge portion of the ducted lift/thrust fans. Embodiments of the aircraft position the ducted lift fan and the pair of ducted lift/thrust fans with respect to one another to be triangulated about a center of gravity for the aircraft. Thrust from each of the pair of ducted lift/thrust fans is independently controllable to provide roll control of the aircraft. Thrust from the lift fan in the rearward portion of the fuselage is controllable to provide pitch control of the aircraft.

Embodiments of the aircraft include a power plant that is disposed within the fuselage and operatively coupled with the pair of ducted lift/thrust fans and the lift fan. In some such embodiments, the power plant includes a plurality of engines that are operatively coupled with a single power transmission system, which is coupled with the pair of ducted lift/thrust fans and the lift fan. A first output shaft and second output shaft extend transversely, in opposite directions from a gear box, which is operatively coupled with the plurality of engines, and are coupled with reduction gear boxes associated with the pair of ducted lift/thrust fans. A third output shaft extends rearwardly from the gearbox and is coupled with a reduction gear box associated with the rear lift fan contained in the fuselage.

These and other aspects of the present system and method will be apparent after consideration of the Detailed Description and Figures herein. It is to be understood, however, that the scope of the invention shall be determined by the claims as issued and not by whether given subject matter addresses any or all issues noted in the Background or includes any features or aspects recited in this Summary.

DRAWINGS

Non-limiting and non-exhaustive embodiments of the present invention, including the preferred embodiment, are described with reference to the following figures, wherein like reference numerals refer to like parts throughout the various views unless otherwise specified.

FIG. 3 depicts a front elevation view of the VTOL aircraft depicted in FIG. 1.

FIG. 4 depicts a front elevation view of the VTOL aircraft depicted in FIG. 2.

FIG. 7 depicts a side elevation view of the VTOL aircraft depicted in FIG. 1.

FIG. 8 depicts a side elevation view of the VTOL aircraft depicted in FIG. 2.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Figure 15:
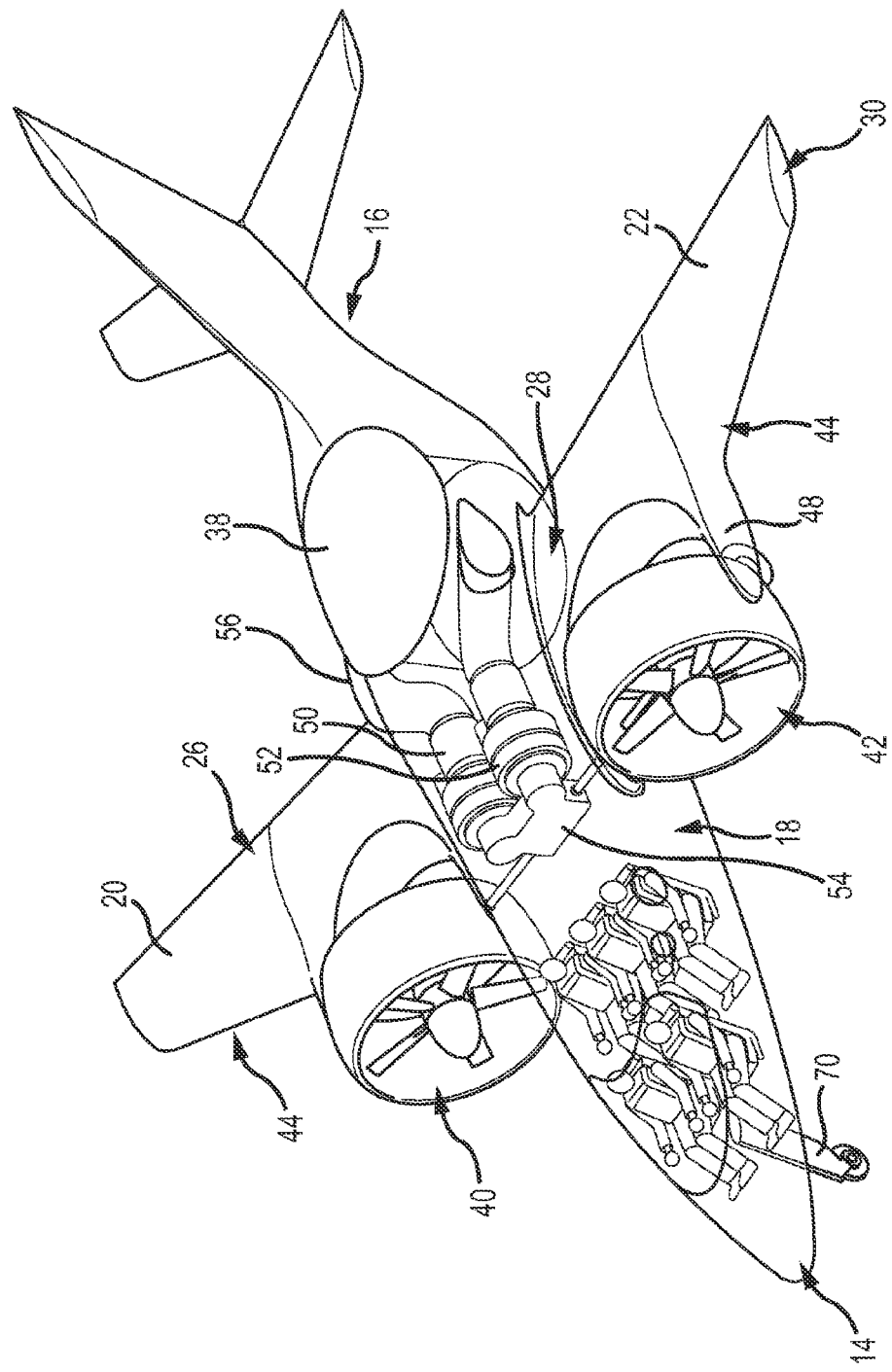
FIG. 15 depicts a schematic perspective view of one embodiment of the VTOL of the present technology and one configuration of a passenger compartment.
Figure 16:
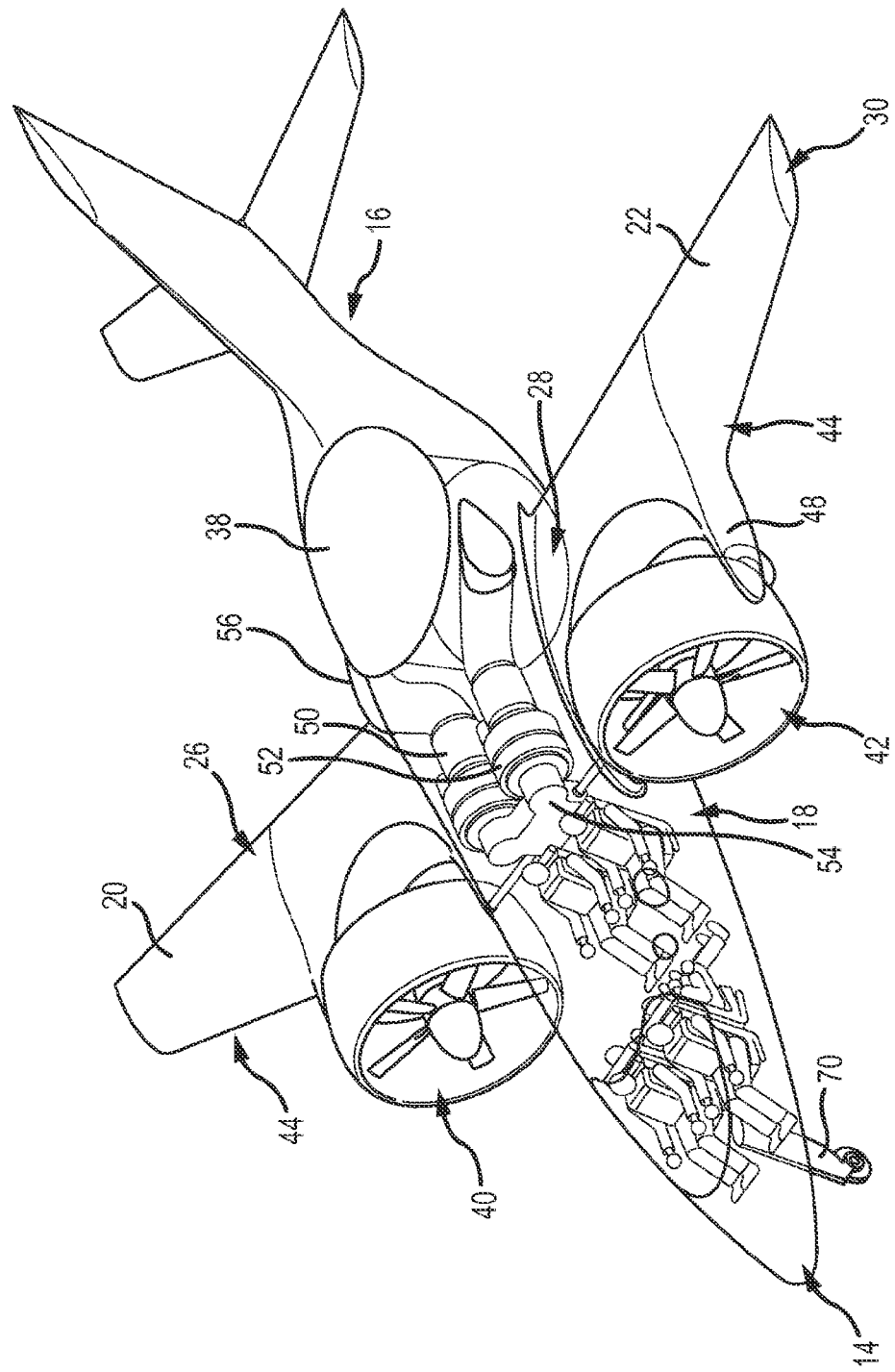
FIG. 16 depicts a schematic perspective view of another embodiment of the VTOL of the present technology and an alternate configuration of a passenger compartment.

Embodiments of the present technology, as they relate to a VTOL aircraft 10, are generally depicted in FIGS. 1-16. With particular reference to FIGS. 1-9, 15, and 16, embodiments of the VTOL aircraft 10 include a fuselage 12 having a forward end portion 14, a rearward end portion 16, and a central portion 18 that extends between the forward end portion 14 and rearward end portion 16. Various embodiments of the fuselage 12 are elongated, defining a central longitudinal roll axis X of the VTOL aircraft 10. In at least some embodiments, the fuselage 12 is provided with a length of 41 feet and a cabin width of 78 inches. In some embodiments, such as depicted in FIGS. 15 and 16, the forward end portion 14 of the fuselage 12 may be configured with a passenger and flight control compartment. In various embodiments, such as depicted in FIG. 15, the passenger and flight control compartment may be configured for a total of five people. This may include a flight crew of between one and two people and three to four passengers. Aft of the passenger and flight control compartment, the VTOL aircraft 10 may include a storage or payload compartment. In other embodiments, the VTOL aircraft may be increased in size to accommodate a greater number of individuals and/or payload. For example, FIG. 16 depicts one embodiment where the passenger and flight control compartment may be configured for a total of six people. This may include a flight crew of between one and two people and four to five passengers.

A pair of wings and, in particular a first wing 20 and second wing 22, are secured in a fixed position with respect to the fuselage 12. The first wing 20 and second wing 22 are each defined by a leading edge portion 24, a trailing edge portion 26, a root end 28, and an opposite tip end portion 30. The root ends 28 of the first wing 20 and second wing 22 are respectively coupled with the central portions 18 of the fuselage 12, such that the first wing 20 and second wing 22 extend laterally outward from the fuselage 12. In at least some embodiments, the first wing 20 and second wing 22 are of a swept wing design, providing the VTOL aircraft with a wing span of 38 feet and a wing area of approximately 240 square feet. In certain embodiments, the wings provide the VTOL aircraft 10 with a stall speed of less than 80 kts.

Figure 2:
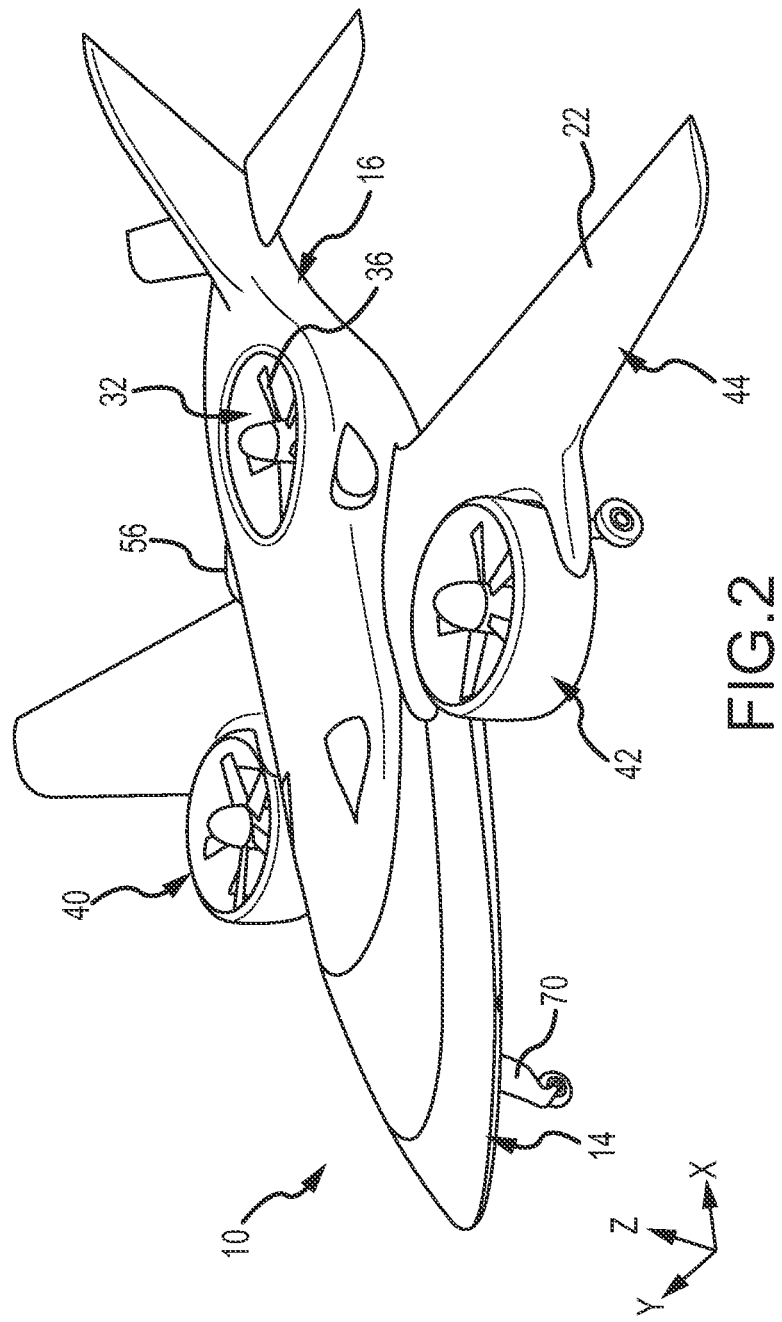
FIG. 2 depicts a perspective view of the VTOL aircraft depicted in FIG. 1 and depicts one manner in which the VTOL aircraft may be configured for landing or takeoff.
Figure 5:
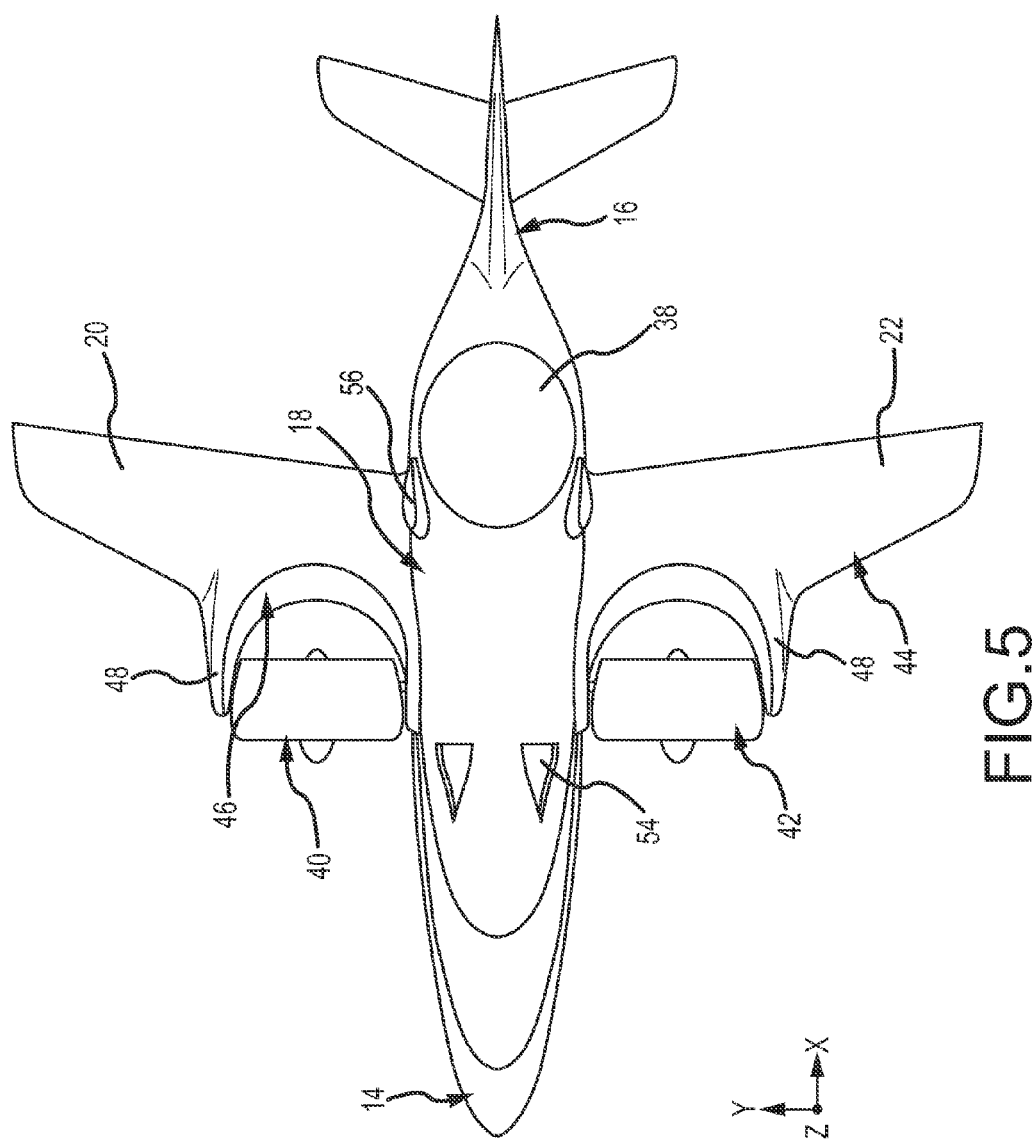
FIG. 5 depicts a top plan view of the VTOL aircraft depicted in FIG. 1.
Figure 6:
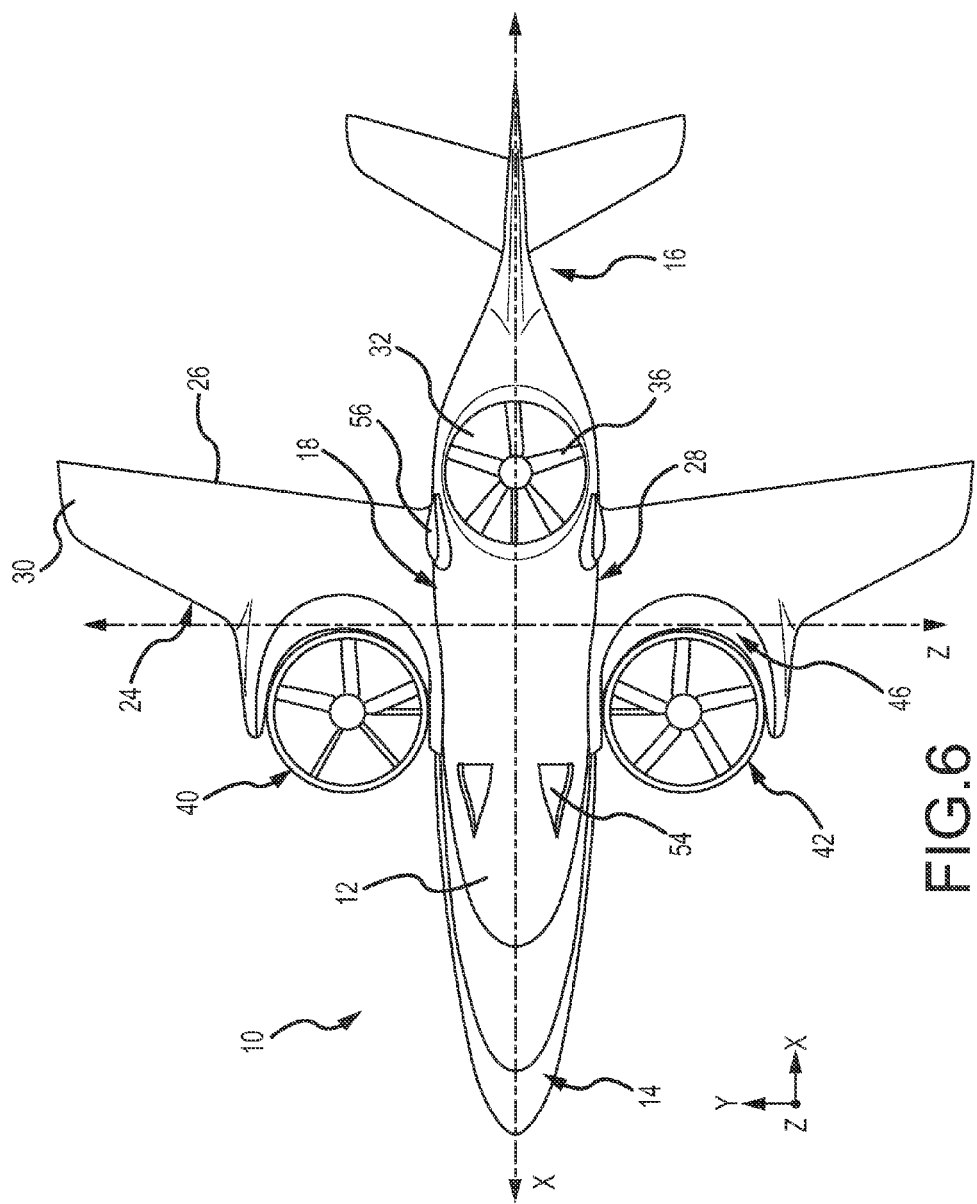
FIG. 6 depicts a top plan view of the VTOL aircraft depicted in FIG. 2.
Figure 9:
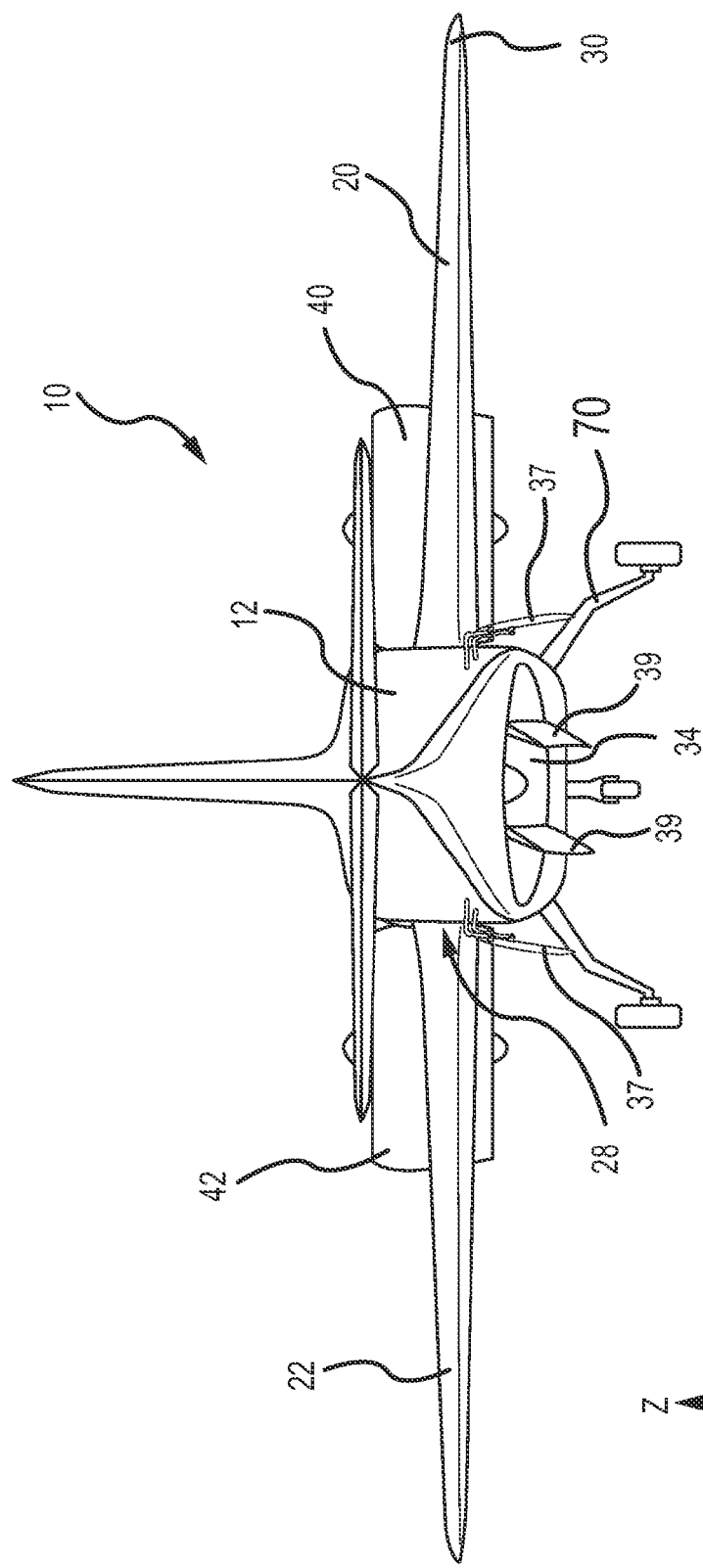
FIG. 9 depicts a rear elevation view of the VTOL aircraft depicted in FIG. 2 and further depicting an embodiment that employs vanes below the body fan for providing yaw control.

With reference to FIGS. 2 and 6, various embodiments of the VTOL aircraft 10 include a downwardly exhausting, ducted lift fan 32 that is disposed within the fuselage 12, between a pitch axis Z of the VTOL aircraft 10 and the rearward end portion 16 of the fuselage 12. As this term is used herein, a "ducted fan" is simply a system that accelerates air as it passes through a duct or shroud. The duct serves primarily to induce additional air mass flow through the fan blades than would occur without the duct. This increases the "thrust", which is the force of reaction to the acceleration of air, as compared to a non-ducted fan or propeller. With specific reference to FIGS. 2 and 6, air is accelerated through the horizontal duct 34 by a multi-bladed fan 36. In the depicted embodiment, the horizontal duct 34 is defined as an opening that penetrates the fuselage 12, behind the pitch axis Z of the VTOL aircraft 10 and forward from the rearward end portion 16 of the fuselage 12. It is contemplated that the horizontal duct 34 and the fuselage 12 could be formed of unitary construction or as separate structures that are secured in a fixed position with respect to one another.

With reference to FIGS. 1, 2, 5, 6, and 9, a set of hinged "clam shell" door covers or louvers 37 may be associated with the bottom outlet opening of the horizontal duct 34 and a retractable cover 38 may be associated with the top inlet opening. The bottom door covers 37 and retractable cover 38 will be provided, in various embodiments, to selectively move between open positions (depicted in FIGS. 1 and 5) and closed positions (depicted in FIGS. 2 and 6). In particular, the bottom door covers 37 and the retractable cover 38 will be disposed in the open position where the lift fan 36 is operated to produce lifting thrust through the horizontal duct 34. In some embodiments, the bottom door covers 37 and the retractable cover 38 will be placed in the closed position when the VTOL aircraft is operated in forward flight, where lifting thrust from the fan 36 is not desired or needed. It is contemplated that the bottom door covers 37 and the retractable cover 38 may be provided in a plurality of components that retract fore and aft or in opposite, lateral directions. A one-piece retractable cover 38 may also be used that retracts fore or aft on various known methods. In still another embodiment, it is contemplated that the bottom door covers 37 and retractable cover 38 may be provided as a plurality of louvers that rotate between closed and substantially open positions. In one such embodiment, one or more louvers 39 are pivotably coupled directly beneath the lift fan 36 and movable between open and closed positions and discreet points therebetween. In the closed position, the louvers 39 form a part of the bottom door covers 37 to close the bottom outlet opening of the horizontal duct 34. This reduces the size of the outboard panels of the bottom door covers 37. The louvers 39 are disposed in an open position during hovering flight of the VTOL aircraft 10. Operative mechanical or electronic coupling of the louvers 39 and flight controls, such as rudder pedals or the like, enable selective angular disposition of the louvers when in the open position. Selective angular position beneath the bottom outlet opening of the horizontal duct 34 may be used to deflect the thrust output of the horizontal duct 34 and provide the VTOL aircraft 10 with an aspect of yaw control.

With reference to FIGS. 1-8, embodiments of the VTOL aircraft 10 include a pair of ducted lift/thrust fans. In particular, the depicted embodiments include a first lift/thrust fan 40 and second lift/thrust fan 42 that are respectively coupled with the first wing 20 and second wing 22. In various embodiments, the first lift/thrust fan 40 and second lift/thrust fan 42 include a six foot diameter, five blade rotor 41. Embodiments of the rotors 41 are rated for over 700 hp. It is contemplated that the size of the rotor 41 may increase or decrease according to the dimensions and desired performance characteristics for the VTOL aircraft 10. In some embodiments, the pitch of the blades within the rotors 41 may be varied on demand according to the desired output performance. Thrust from each of the lift/thrust fans 40 and 42 is independently controllable in various embodiments.

Figure 1:
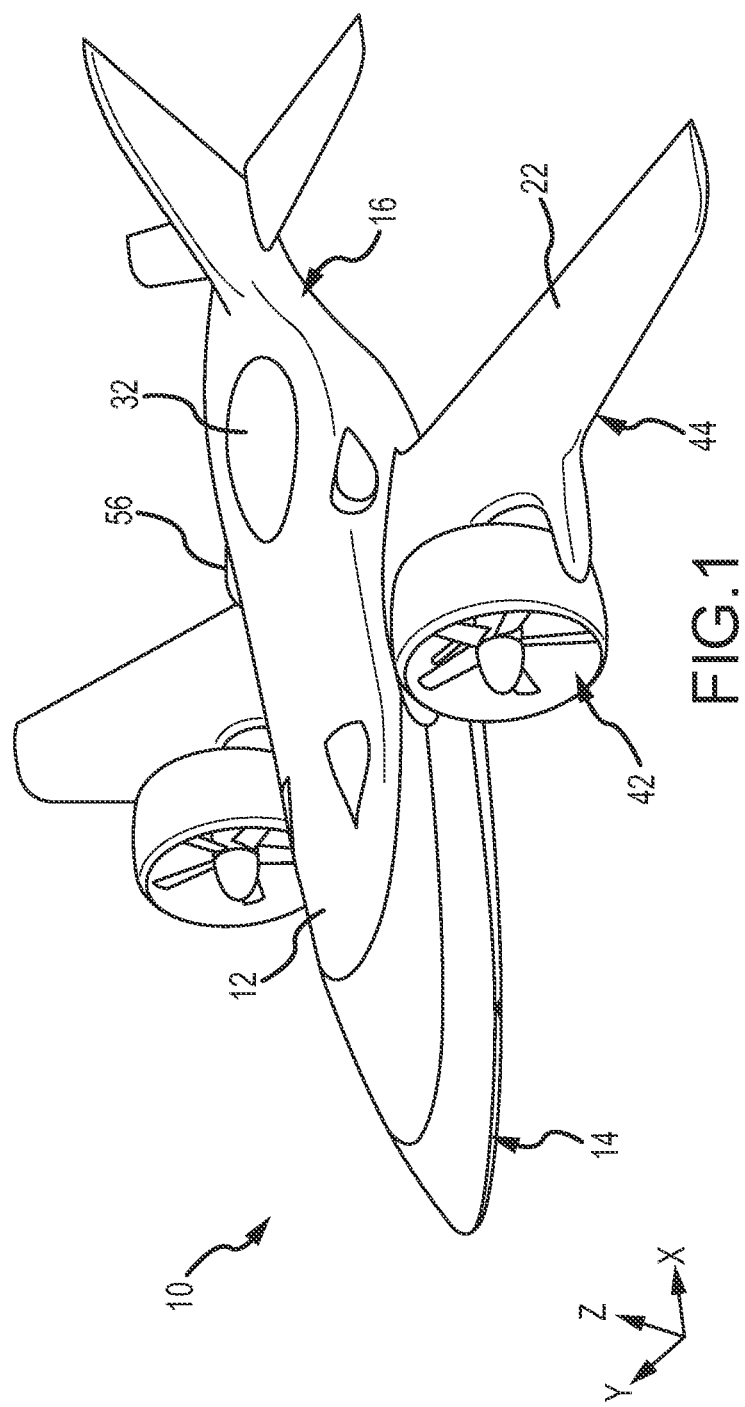
FIG. 1 depicts a perspective view of one embodiment of the VTOL aircraft of the present technology and one manner in which the VTOL aircraft may be configured for forward flight.

The first lift/thrust fan 40 and second lift/thrust fan 42 are positioned symmetrically with one another on opposite sides of a roll axis X of the VTOL aircraft 10 and forward of the pitch axis Z. In this manner, the lift fan 32 and the pair of ducted lift/thrust fans 40 and 42 are positioned with respect to one another to be triangulated about at least one, and in some embodiments all, of: a center of lift for the first wing 20 and second wing 22; a center of lift for the lift fan 32 and the ducted lift/thrust fans 40 and 42; and a center of gravity for the VTOL aircraft 10. The first lift/thrust fan 40 and second lift/thrust fan 42 are coupled with the first wing 20 and second wing 22 such that they are selectively, rotatably movable between a first position in which they provide vertical lift (FIG. 2) and a second position in which they provide horizontal thrust (FIG. 1). In some embodiments, the first lift/thrust fan 40 and second lift/thrust fan 42 are rotated between the first and second positions using mechanical, hydraulic, or electromechanical actuators capable of inducing movement, while being subjected to significant forces external, as well as locking the assembly in a single position when desired.

In the depicted embodiments, leading edge portions 44 of each of the first wing 20 and second wing 22 include a curvilinear fan recess 46. Each of the first lift/thrust fan 40 and second lift/thrust fan 42 are rotatably disposed within a curvilinear fan recess 46. As depicted, embodiments of the present technology shape the curvilinear fan recesses 46 to approximate a shape of a circumferential edge portion of the first lift/thrust fan 40 and second lift/thrust fan 42. In this manner, the first lift/thrust fan 40 and second lift/thrust fan 42 may be horizontally disposed to nest within the curvilinear fan recesses 46. The curvilinear recesses 46 allow the first lift/thrust fan 40 and second lift/thrust fan 42 to be located aft, closely adjacent the pitch axis Z of the VTOL aircraft 10. The leading edge portions 44 include opposing pairs of mounting shoulders 48 that project forward to pivotably engage the first lift/thrust fan 40 and second lift/thrust fan 42 approximate axial pivot points on the first lift/thrust fan 40 and second lift/thrust fan 42. In some embodiments, the first wing 20 and second wing 22 are provided with an aft sweep. This enables the first lift/thrust fan 40 and second lift/thrust fan 42 to be positioned intermediate the a root end 28 and an opposite tip end portion 30 of the first wing 20 and second wing 22. As the position of the first lift/thrust fan 40 and second lift/thrust fan 42 move inwardly from the tip end portions 30 of the first wing 20 and second wing 22 a less structurally robust support is required throughout the first wing 20 and second wing 22, which reduces overall weight of the VTOL aircraft 10.

Figure 10:
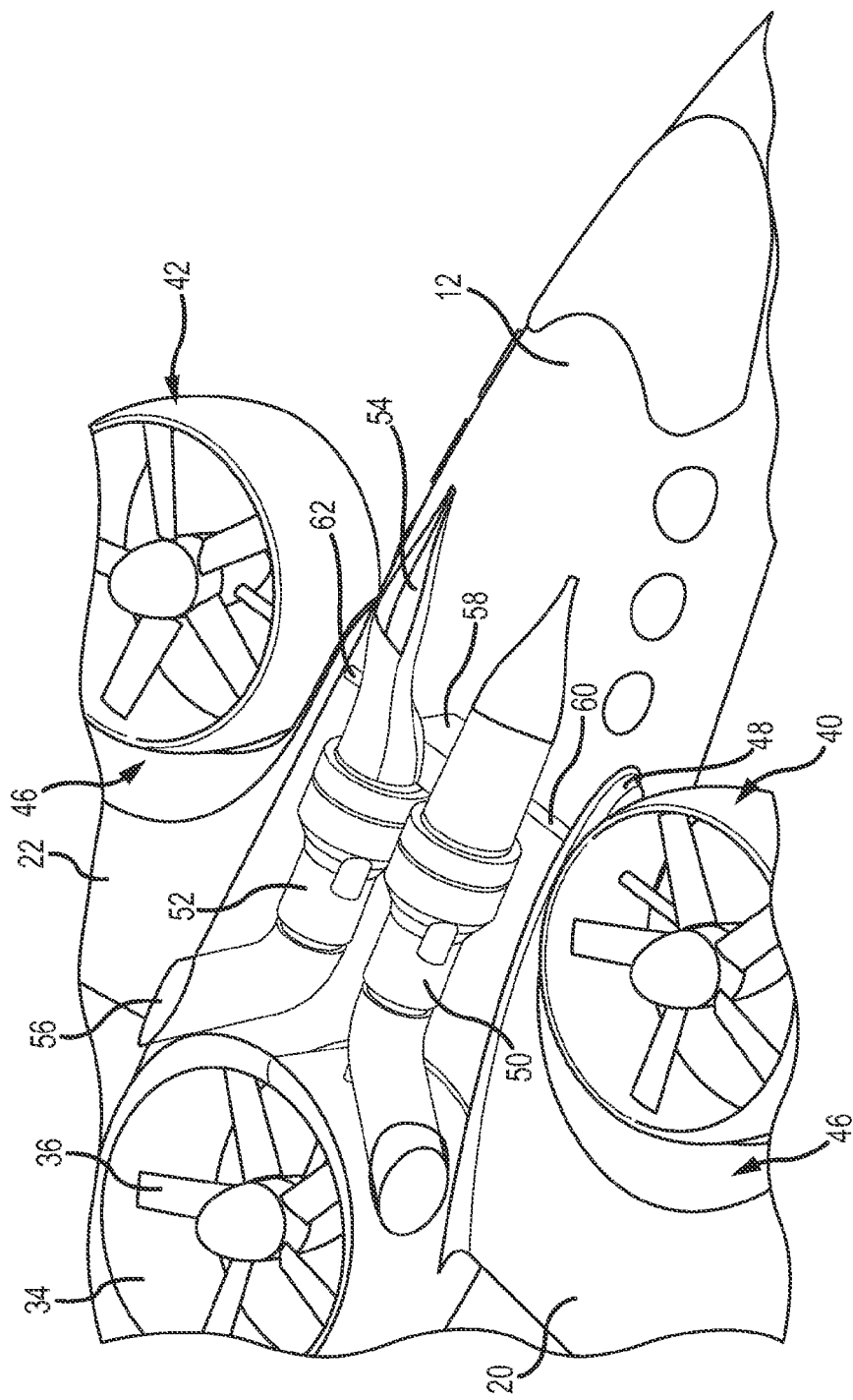
FIG. 10 depicts a perspective, cut-away view of the VTOL aircraft depicted in FIG. 2 and further demonstrates one manner in which engines and their intakes and exhaust ports may be positioned with respect to the fuselage and ported fans of the VTOL aircraft.
Figure 11:
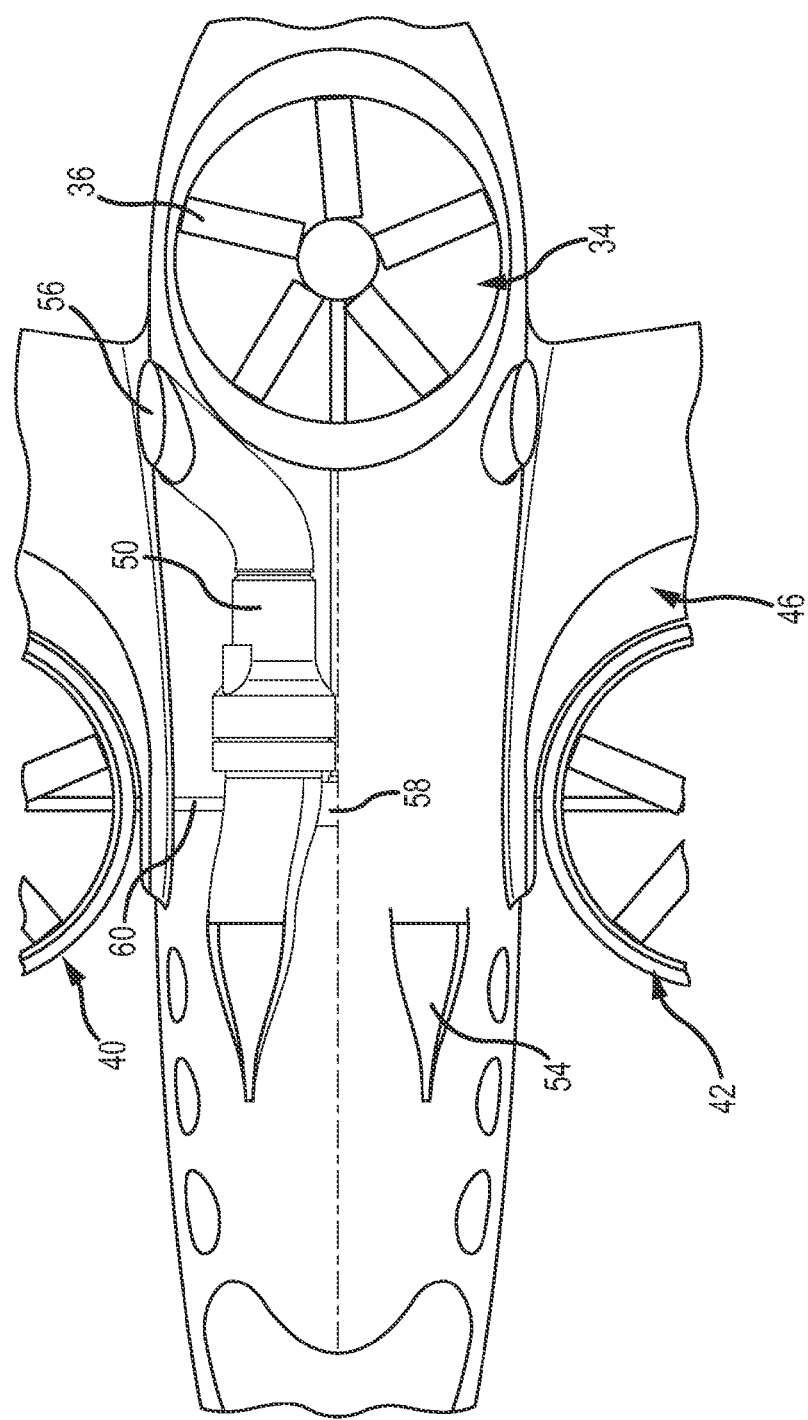
FIG. 11 depicts a top plan, cut-away view of the VTOL aircraft depicted in FIG. 10.
Figure 12:
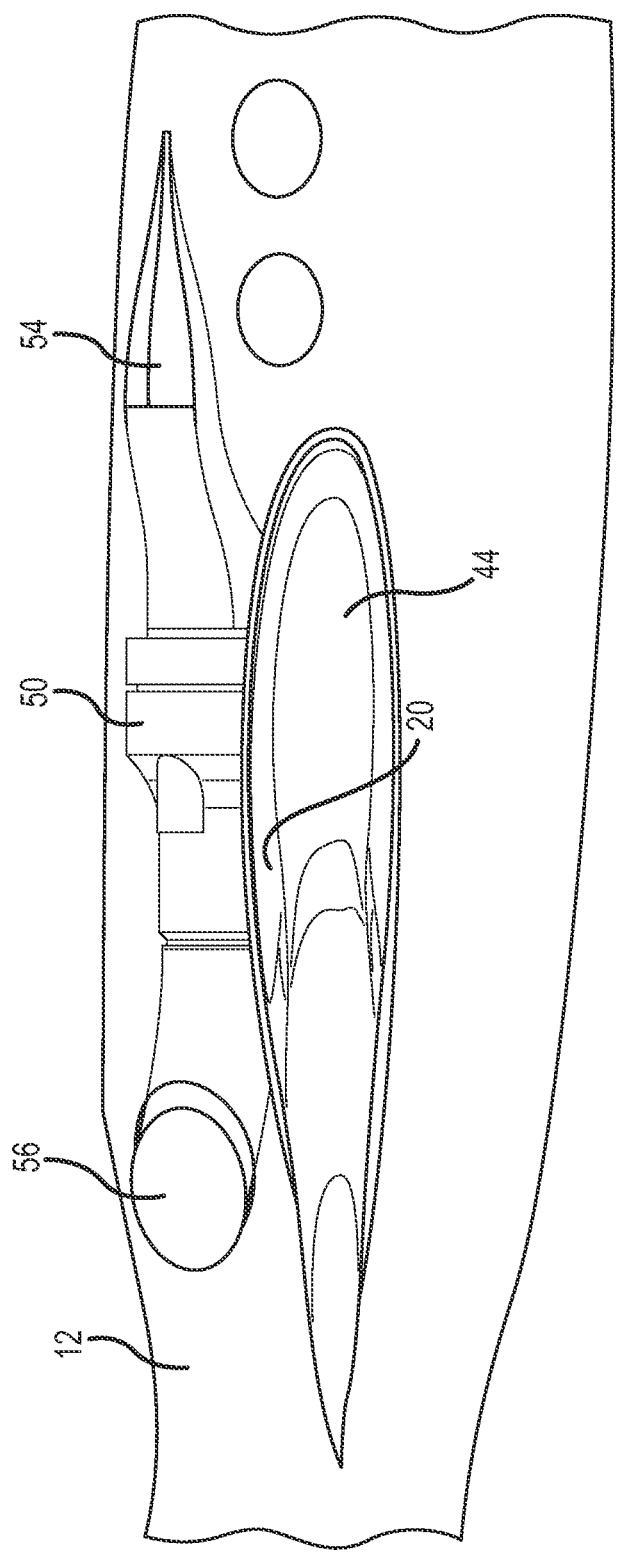
FIG. 12 depicts a side elevation, cut-away view of the VTOL aircraft depicted in FIG. 10.
Figure 13:
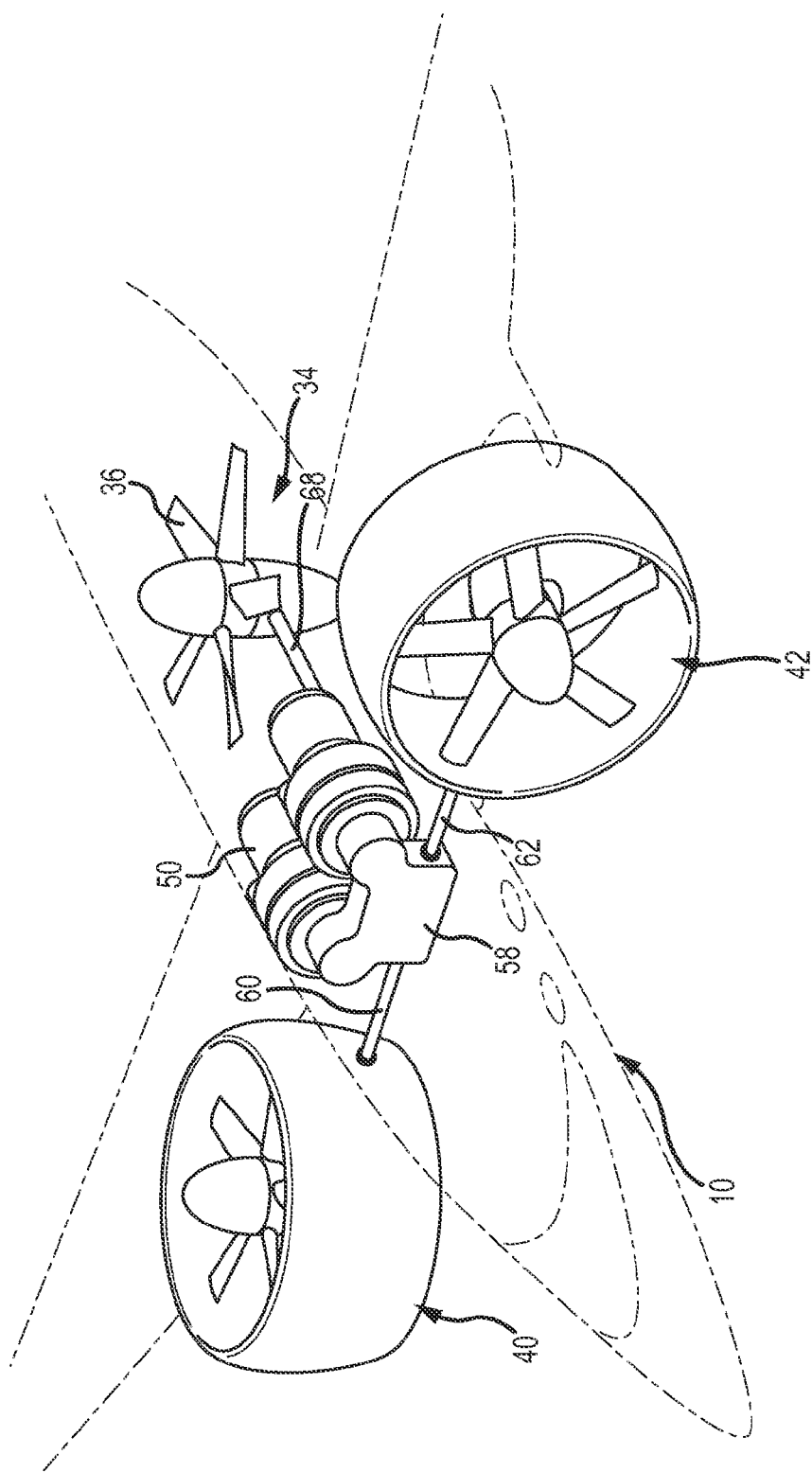
FIG. 13 depicts a perspective schematic view of an embodiment of the VTOL aircraft of the present technology and demonstrates one manner in which engines and transmission systems may be coupled with the ducted fans.

With reference to FIGS. 10-14, the VTOL aircraft 10 includes a power plant and power transmission system that supplies power to the lift fan 32, the first lift/thrust fan 40, and second lift/thrust fan 42. It is contemplated that a single engine could be used to supply power to the VTOL aircraft 10. However, the depicted embodiments include a first engine 50 and second engine 52 that are positioned astride one another within the fuselage 12 between the first wing 20 and second wing 22. In one particular embodiment, the first engine 50 and second engine 52 are each at least comparable to an engine having maximum rated sea level power of over 2,000 shp. As depicted in FIGS. 10 and 11, a pair of opposing NACA style air inlet ducts 54 penetrate the fuselage, forward from the first engine 50 and second engine 52. A pair of exhaust ports 56 pass from the first engine 50 and second engine 52 and penetrate the opposite sides of the central portion 18 of the fuselage 12.

Figure 14:
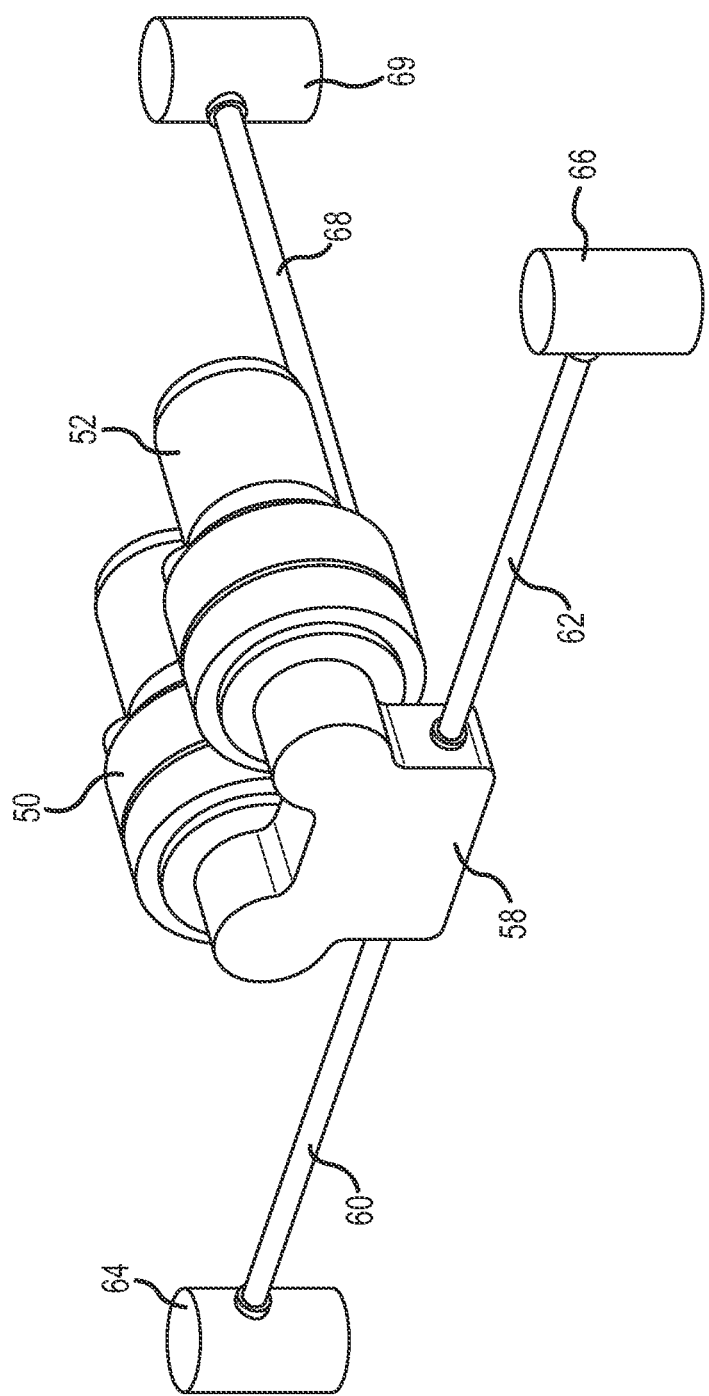
FIG. 14 depicts an isometric view of engines and a power transmission system configured for use with embodiments of the VTOL aircraft of the present technology.

With further reference to FIG. 14, an exemplary power transmission system for use with the VTOL aircraft 10 includes a gear box 58 that receives the power output from the first engine 50 and second engine 52. In the depicted embodiment, a first output shaft 60 and second output shaft 62 extend transversely from the gear box 58 and engage a first reduction gear 64 and second reduction gear 66 associated with the first lift/thrust fan 40 and second lift/thrust fan 42, respectively. A third output shaft 68 extends rearwardly from the gear box 58 and engages a third reduction gear 69 associated with the lift fan 32. In various embodiments, it is contemplated that the output shafts described herein may be provided as dual, coaxial shafts, which provide redundancy to the power transmission system.

The VTOL aircraft 10 includes flight control systems for operating the VTOL aircraft 10 through various flight operations. Aspects of the flight operations will be monitored, and in certain instances, directly controlled by a flight control computer. A processor associated with the flight control computer will receive data input from one or more associated systems. For example, embodiments of the flight control systems include a plurality of pilot inputs, which transmit data to the flight control computer. These pilot inputs include, but are not limited to, pitch and roll commands from a flight control stick, yaw from rudder pedals, trim commands, and power commands from engine throttle controls. In various embodiments, the flight control systems are operatively coupled with aircraft control surfaces that include elevators, ailerons, and a rudder. In some embodiments, the flight control systems are operatively coupled with the ducted lift/thrust fans, and the lift fan in a manner that permits selective control over functions of the aircraft control surfaces, the ducted lift/thrust fans 40 and 42, and the lift fan 36. In some such embodiments, the flight control systems permit selective control of fan blade pitch, power, or rotational speeds of the ducted lift/thrust fans 40 and 42, and the lift fan 36. Embodiments of the VTOL aircraft 10 further include a motion sensor/accelerometer for measuring aircraft acceleration in the X, Y, and Z axis. A rate gyroscope may be provided to receive and relay data related to rotation angles of pitch, yaw, and roll. One or more sensors detect the retracted and deployed states of landing gear 70. Various peripheral systems provide environmental data to the flight control computer including an altimeter, an air data sensor system, a pitot-static probe, and a total temperature probe. The data from such peripheral systems is processed within the flight control computer, which may store such data within one or more associated memory storage systems. One or more displays or multi-functional displays relay the state of flight control to the flight crew.

Embodiments of the VTOL aircraft 10 include an emergency parachute system for use where the VTOL aircraft 10 encounters complete or significant propulsion failure and has insufficient airspeed to perform a gliding emergency landing. Some such embodiments include one or more parachutes that would primarily be used while the VTOL aircraft 10 is in hover mode or travelling at slow speeds. Embodiments of the emergency parachute system secure the parachute within a compartment within the fuselage 12, adjacent its rearward end portion 16. Supporting parachutes cables are coupled to the airframe. In some embodiments, the emergency parachute is deployed by the pilot via a pilot input or is automatically deployed by a flight control computer if an engine loses power or the VTOL aircraft 10 becomes unstable in hover mode. In some embodiments, the emergency parachute system deploys the rockets that shoot out at an angle from the fuselage 12 and pull the ends of the parachute in opposite directions, thereby deploying the canopy. If the VTOL aircraft 10 is traveling in forward flight, the flight control computer may be programmed to receive data from one or more air sensors in order to determine if a need exists to delay deployment of the parachute where the speed is too great.

The flight control systems of the VTOL aircraft 10, as described above, simplify vertical takeoff and landing operations as well as the transitions between hovering modes and forward flight. For example, an operator initiates a vertical takeoff by positioning the lift/thrust fans in the first, takeoff position so that the thrust thereof directs toward the ground as shown in FIG. 2. The operator engages a pilot input to initiate a start mode. Data received within the flight control computer actuates the bottom door covers 37 and retractable covers 38 to move into open positions. Start sequences are then initiated for the lift fan 32, first lift/thrust fan 40, and second lift thrust/fan 42. The flight control system allows the fans to reach an idling state. When the thrust of the lift fan 32, first lift/thrust fan 40, and second lift/thrust fan 42 reach determined values or greater, the operator engages a hovering mode from a pilot input associated with the flight control system. The thrust of the lift fan 32, first lift/thrust fan 40, and second lift/thrust fan 42 are increased until the VTOL aircraft 10 lifts off.

With the VTOL aircraft 10 hovering in a stable manner, the operator selects a cruise mode from a pilot input associated with the flight control computer. A signal is sent from the flight control computer to gradually tilt the first lift/thrust fan 40 and second lift/thrust fan 42 from the first position to the second position in order to produce a forward moving force. As the VTOL aircraft 10 accelerates into forward flight, lift force is generated on the wings and the VTOL aircraft 10 cruises with the thrust of the first lift/thrust fan 40 and second lift/thrust fan 42 directed backward. The operator may then execute manual operation by means of the control stick and steering pedals. Concurrently, or in the alternative, flight operations can be left to automatic operation performed based on data received from the peripheral sensors and systems associated with the flight control computer.

The VTOL aircraft 10, of the present technology, provides a vertical takeoff and landing aircraft that can cruise with high speed and does not need a runway for taking off or landing because it may take off from, or land on, the ground vertically. In at least some embodiments, the VTOL aircraft 10 has a total weight (empty) of less than 5,000 pounds. Various embodiments afford the VTOL aircraft with a maximum VTOL takeoff weight of over 6,000 pounds. Such embodiments of the VTOL aircraft 10 can, in less than 90 seconds from vertical takeoff, attain an altitude of approximately 2,000 feet, 3 nautical miles down range, at a cruising speed of 240 kts true at a 10 degree climb angle. When desired, the VTOL aircraft 10 may also perform short (STOL) or conventional takeoffs and landings. Embodiments of the present technology permit takeoffs and landings of less than 700 feet on a runway with the first lift/thrust fan 40 and second lift/thrust fan 42 in the first position (forward flight), with a maximum STOL takeoff weight of over 7,000 pounds. The runway distance for takeoff may be shortened to approximately 300 feet where the first lift/thrust fan 40 and second lift/thrust fan 42 are rotated up 40 degrees between the first position and the second position. In such embodiments, the VTOL aircraft will provide an NBAA VFR range of 1,200 nautical miles and an NBAA IFR range of 1,100 nautical miles (calculated at 240 KTAS cruise speed at an altitude of 29,000 feet).

Although the technology has been described in language that is specific to certain structures, materials, and methodological steps, it is to be understood that the invention defined in the appended claims is not necessarily limited to the specific structures, materials, and/or steps described. Rather, the specific aspects and steps are described as forms of implementing the claimed invention. Since many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. An aircraft capable of vertical takeoff and landing, the aircraft comprising:
    a fuselage having a forward end portion, a rearward end portion, and a central portion that extends between the forward end portion and rearward end portion; the fuselage defining a central longitudinal axis of the aircraft;
    a pair of wings, each having: a leading edge portion; a trailing edge portion; a root end respectively coupled with the central portion of the fuselage; and an opposite tip end portion extending laterally outward from the fuselage; the leading edge portions of each of the wings include a curvilinear fan recess;
    a pair of ducted lift/thrust fans respectively coupled with one of the pair of wings such that the fans are positioned symmetrically with one another on opposite sides of a roll axis of the aircraft and forward of a pitch axis of the aircraft; the pair of ducted lift/thrust fans being selectively, rotatably movable between a first position in which they provide vertical lift and a second position in which they provide horizontal thrust; each of the pair of ducted lift/thrust fans respectively, rotatably disposed within a curvilinear fan recess, wherein the curvilinear fan recesses are shaped to approximate a shape of a circumferential edge portion of the ducted lift/thrust fans and leave the pair of ducted lift/thrust fans uncovered when the pair of ducted lift/thrust fans are in the first position; and
    a downwardly exhausting, ducted lift fan disposed within the fuselage, between the pitch axis and the rearward end portion of the fuselage.

2. The aircraft of claim 1 wherein the leading edge portions of each of the wings are aft swept to align a lift from the pair of ducted lift/thrust fans and the ducted lift fan with a lift of the wings.

3. The aircraft of claim 1 wherein the ducted lift fan and the pair of ducted lift/thrust fans are positioned with respect to one another to be triangulated about a center of gravity for the aircraft.

4. The aircraft of claim 1 wherein the ducted lift fan and the pair of ducted lift/thrust fans are positioned with respect to one another to be triangulated about a center of lift for the pair of wings.

5. The aircraft of claim 1 wherein the ducted lift fan and the pair of ducted lift/thrust fans are positioned with respect to one another to be triangulated about a center of lift for the ducted lift fan and the pair of ducted lift/thrust fans.

6. The aircraft of claim 1 wherein the ducted lift fan and the pair of ducted lift/thrust fans are positioned with respect to one another to be triangulated about: a center of gravity for the aircraft; a center of lift for the aircraft; and a center of lift for the ducted lift fan and the pair of ducted lift/thrust fans.

7. The aircraft of claim 1 wherein thrust from each of the pair of ducted lift/thrust fans is independently controllable.

8. The aircraft of claim 1 further comprising at least one cover that is selectively movable between open and closed positions with respect to the ducted lift fan.

9. The aircraft of claim 8 wherein the at least one cover includes at least one louver that is positioned beneath the ducted lift fan and in line with a thrust output of the ducted lift fan; the at least one louver being selectively, pivotably movable along various degrees between the open and closed positions with respect to the ducted lift fan, such that the thrust output is selectively, angularly directed, to provide yaw control for the aircraft.

10. The aircraft of claim 9 wherein the at least one louver combines with at least one selectively movable outboard bottom door to define a bottom door cover for the ducted lift fan.

11. The aircraft of claim 1 further comprising a power plant disposed within the fuselage, the power plant being operatively coupled with the pair of ducted lift/thrust fans and the lift fan.

12. The aircraft of claim 11 wherein the power plant is comprised of a plurality of engines that are operatively coupled with a single power transmission system that is coupled with the pair of ducted lift/thrust fans and the lift fan.

13. The aircraft of claim 12 wherein a first output shaft and second output shaft extend transversely, in opposite directions from a gear box, which is operatively coupled with the plurality of engines, and are coupled with reduction gear boxes associated with the pair of ducted lift/thrust fans; a third output shaft extends rearwardly from the gearbox and is coupled with a reduction gear box associated with the rear lift fan contained in the fuselage.

14. The aircraft of claim 1 wherein the pitch control of the aircraft is effected by varying the power distributed to the ducted lift/thrust fans and lift fan by increased fan blade pitch or increased fan rotational velocity.

15. The aircraft of claim 1 wherein the roll control of the aircraft is effected by varying the power distributed to the ducted lift/thrust fans by increased fan blade pitch or increased fan rotational velocity.

16. The aircraft of claim 1 further comprising:
flight control systems operatively coupled with aircraft control surfaces, the ducted lift/thrust fans, and the lift fan in a manner that permits selective control over functions of the aircraft control surfaces, the ducted lift/thrust fans, and the lift fan.

17. The aircraft of claim 16 wherein the aircraft control surfaces include elevators, ailerons, and a rudder.

18. The aircraft of claim 16 wherein the flight control systems permit selective control of fan blade pitch, power, or rotational speeds of the ducted lift/thrust fans and the lift fan.

19. An aircraft capable of vertical takeoff and landing, the aircraft comprising:
a pair of ducted lift/thrust fans respectively coupled with one of a pair of wings such that the fans are positioned symmetrically with one another on opposite sides of a roll axis of the aircraft and forward of a pitch axis of the aircraft; the pair of ducted lift/thrust fans being selectively, rotatably movable between a first position in which they provide vertical lift and a second position in which they provide horizontal thrust; the leading edge portions of each of the wings include a curvilinear fan recess; each of the pair of ducted lift/thrust fans respectively, rotatably disposed within a curvilinear fan recess; wherein the curvilinear fan recesses are shaped to approximate a shape of a circumferential edge portion of the ducted lift/thrust fans and leave the pair of ducted lift/thrust fans uncovered when the pair of ducted lift/thrust fans are in the first position; and
a downwardly exhausting, ducted lift fan disposed within a fuselage of the aircraft, between the pitch axis and the rearward end portion of the fuselage.

20. The aircraft of claim 19 wherein the ducted lift fan and the pair of ducted lift/thrust fans are positioned with respect to one another to be triangulated about at least one of: a center of gravity for the aircraft; a center of lift for the aircraft; and a center of lift for the ducted lift fan and the pair of ducted lift/thrust fans.

21. The aircraft of claim 19 wherein the leading edge portions of each of the wings are aft swept to align a lift from the pair of ducted lift/thrust fans and the ducted lift fan with a lift of the wings.

* * * * *